United States Patent [19]
Rothe

[11] Patent Number: 5,118,922
[45] Date of Patent: Jun. 2, 1992

[54] METHOD AND APPARATUS FOR DETERMINING THE POSITION AND DIAMETER OF THE FOCAL POINT OF A LASER BEAM

[75] Inventor: Rudiger Rothe, Bremen, Fed. Rep. of Germany

[73] Assignee: Dorries Scharmann GmbH, Mechernich, Fed. Rep. of Germany

[21] Appl. No.: 592,771

[22] Filed: Oct. 4, 1990

[30] Foreign Application Priority Data

Oct. 4, 1989 [DE] Fed. Rep. of Germany ....... 3933057

[51] Int. Cl.⁵ .............................................. G01J 1/20
[52] U.S. Cl. ............................. 250/201.2; 250/206.1; 250/208.6; 219/121.78
[58] Field of Search ............... 250/206.1, 206.2, 208.2, 250/208.6, 216, 201.2, 201.4; 356/141, 152; 350/628; 219/121.78, 121.79, 121.81, 121.6, 121.81; 359/867

[56] References Cited

U.S. PATENT DOCUMENTS

| | | | |
|---|---|---|---|
| 3,423,593 | 1/1969 | Chinnock | 250/206.2 |
| 3,956,636 | 5/1976 | Williams | 250/208.6 |
| 4,711,998 | 12/1987 | Malek | 250/206.1 |
| 4,836,669 | 6/1989 | Teach | 356/152 |
| 4,847,479 | 7/1989 | Clark et al. | 219/121.78 |
| 4,893,025 | 1/1990 | Lee | 250/206.1 |
| 5,008,510 | 4/1991 | Koseki | 219/121.79 |

*Primary Examiner*—David C. Nelms
*Assistant Examiner*—Michael Messinger
*Attorney, Agent, or Firm*—Baker & Daniels

[57] ABSTRACT

The present invention is a process and apparatus for determining the position and diameter of the focal point of a laser beam, specifically for use in material processing with a heavy-duty laser beam. In a process for determining the position and diameter of the focal point of a laser beam, specifically a heavy-duty laser beam, a rotationally symmetric reflector which reproduces a laser beam on a focal line is introduced in the path of rays of a focused laser beam. Reflected on the reflector, the laser beam is captured by way of at least one sensor which is fixedly coordinated with the reflector in the focal line, while the focal plane, the lateral position of the focal point and the diameter of the focal point are then determined by way of measured values captured in the sensor, with the sensor being shifted relative to the focusing optics of the laser beam or relative to the reflector. The output intensity of the laser is reduced to a point where the laser can be safely and unequivocally measured with the aid of sensors.

23 Claims, 2 Drawing Sheets

5,118,922

METHOD AND APPARATUS FOR DETERMINING THE POSITION AND DIAMETER OF THE FOCAL POINT OF A LASER BEAM

BACKGROUND OF THE INVENTION

1. Field of the Invention

The present invention relates to determining the position and diameter of the focal point of a laser beam. More specifically, the field of the invention is of an apparatus and method for determining the position and diameter of the focal point of a laser beam, specifically for use in material processing with a high intensity laser beam.

2. Prior Art

The use of laser beams in material processing is well-known. Welding, cutting, boring, chip removal, hardening, and surface treatment are all applications which beneficially utilize a laser.

In all these applications, the laser beam introduces a specific and thus concentrated application of heat energy to a workpiece. Machine workpieces can thereby be formed with little distortion. One example of such a use of a laser beam is found in the German application P 3,925,646, which discloses a process and a device for the erosion of material by means of a laser beam. The German application '646 discloses using the laser beam to heat a specific material volume to an evaporated or molten state, and then blowing away the material with a jet of gas.

In order to optimally use the properties of the laser beam, the position of the focal point and its diameter must be known precisely, especially in the cases of machining workpieces and material. Both the focal point and diameter of the laser beam are determined by the properties of the laser and by the properties of the resonator and transfer lenses used with the laser beam. The aforementioned properties change at high beam output intensities according to the condition and the load on the lenses. As a result, a laser focal point must be determined at the output intensity contemplated for the particular application. Since the focusing of high intensity beams, e.g., $CO_2$ heavy-duty lasers, results in very high output intensities on the order of $10^3$ W/mm$^2$ (watts per square millimeter) or more, accurately ascertaining the necessary measurements on the laser focal point is relatively problematic. Output intensities on that order will rapidly destroy sensors positioned in the focal point; thus, sensors must be moved very quickly through the focal point to avoid damage from the high intensity laser beam.

To overcome problems inherent in measuring high output intensities, one prior art measuring instrument provides a reflecting needle which is rotated through the laser beam at very high speed. Additionally, other prior art measuring instruments quickly deflect the focused laser beam across a round or slotted aperture by means of rotary mirrors. However, these prior apparatuses are very expensive; furthermore, they are frequently destroyed and for various reasons produce considerable measuring errors.

Another method of measuring high output intensities makes use of the effect of the laser beams on the processed materials. A plastic or wood bar, located at a predetermined angle, is moved very quickly through the focal range, and an inference is made on the focal point position based on the visible geometry of the bar in the zone of exposure to the beam. This method may be inaccurate since the effect of the beam on the bar is influenced by many extraneous factors including unassessed time integration effects. Also, determining the position of the focal point for beams of slender focus is difficult.

What is needed is a process for measuring laser beams with high output intensities wherein the output intensity is sufficiently reduced so that the focal point can be determined safely and accurately with the aid of sensors. Additionally, a device for the application of this process is needed.

SUMMARY OF THE INVENTION

The aforementioned problems are solved by using the inventional process which sufficiently reduces the output intensity so that the focal point can be safely and accurately determined. First a rotationally symmetric reflector is introduced into the path of beams of a focused laser light and it reproduces the laser beam on a focal line. Next, the laser beam reflected on the reflector is captured by means of at least one sensor which is fixedly coordinated in the focal line with the reflector. Finally, the reflector with the sensor is moved within the direction of the laser beam and the focal plane and the diameter of the focal point are determined by means of the measured value captured in the sensor. The reflector can be introduced from the diverging side of the laser beam or from the converging side of the laser beam.

The device for the application of this process includes a highly reflective rotationally symmetric reflector whose surface, on which the laser beam impinges, has a shape configured so that the laser beam will be reproduced in a complementary ring-shaped focal line. Further, four sensors are provided which are axially symmetrically located in relation to the reflector. The focal plane and the focal point diameter may be determined by those four sensors, or one sensor may be moved concentrically around the reflector.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
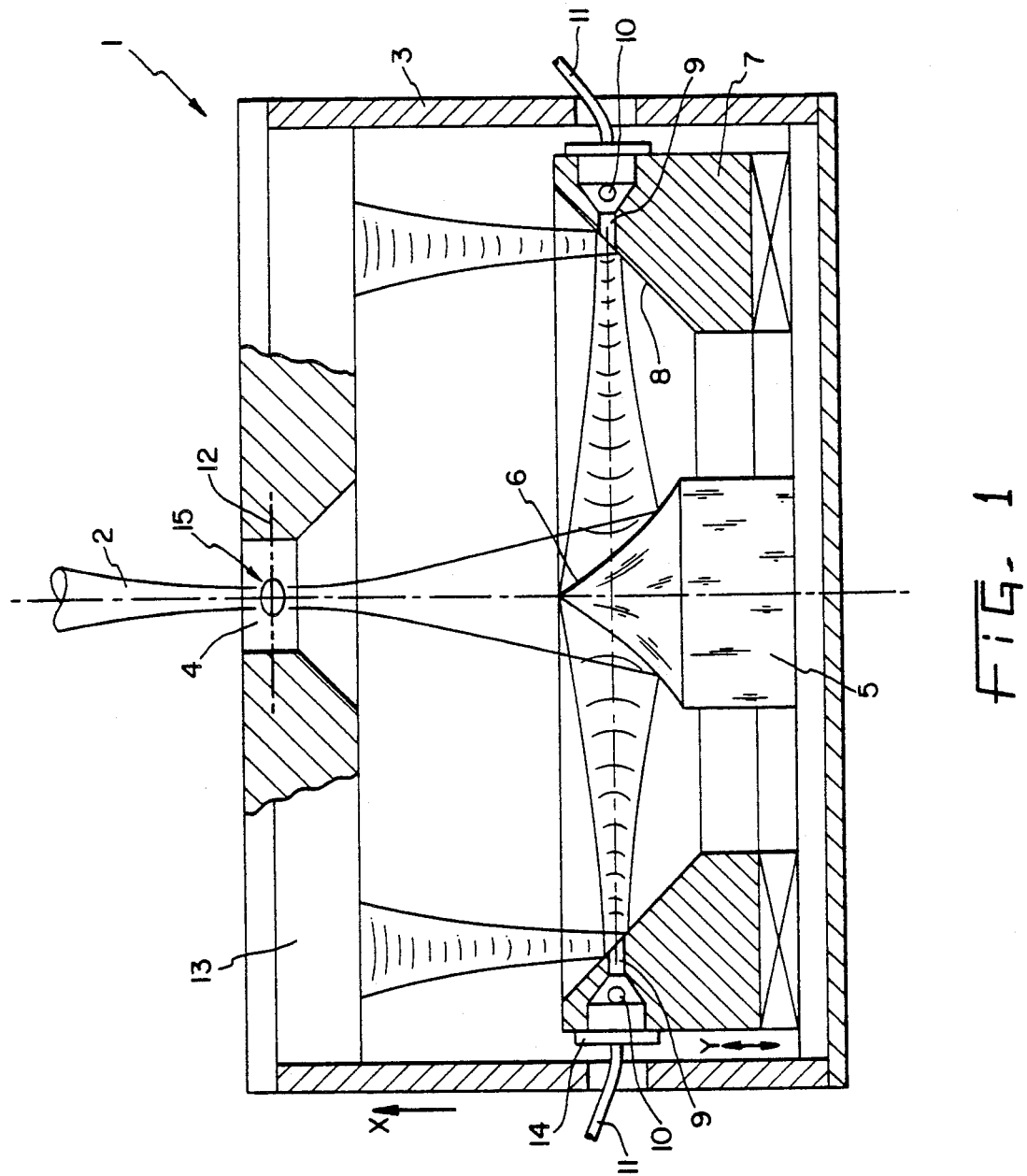
FIG. 1 shows a first embodiment of the present inventional device for determining the position and diameter of the focal point of a laser beam.

Corresponding reference characters indicate corresponding parts throughout the several views. The exemplifications set out herein illustrates preferred embodiments of the invention, in several forms, and such exemplifications are not to be construed as limiting the scope of the invention in any manner.

DESCRIPTION OF THE PREFERRED EMBODIMENT

Figure 2:
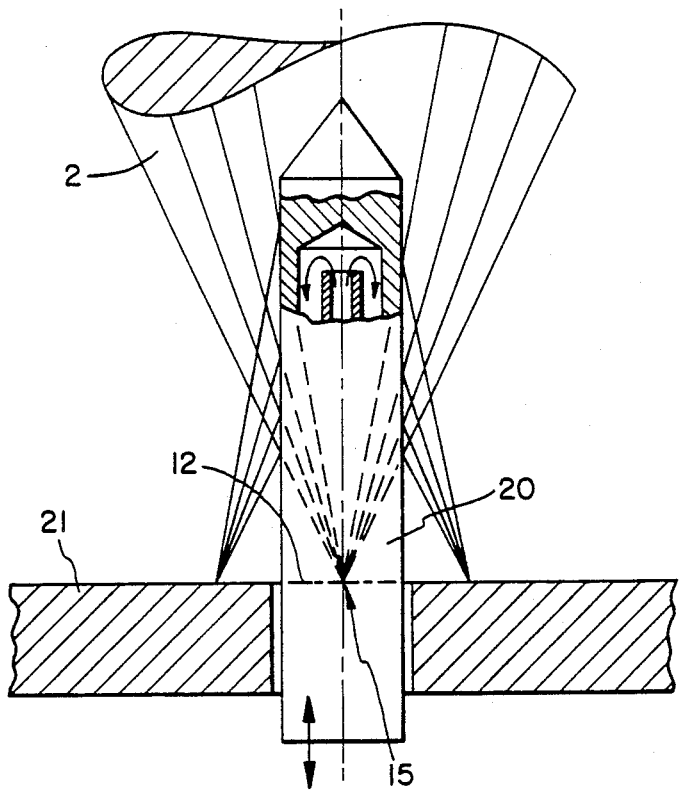
FIG. 2 shows a second embodiment of the present invention.
Figure 3:
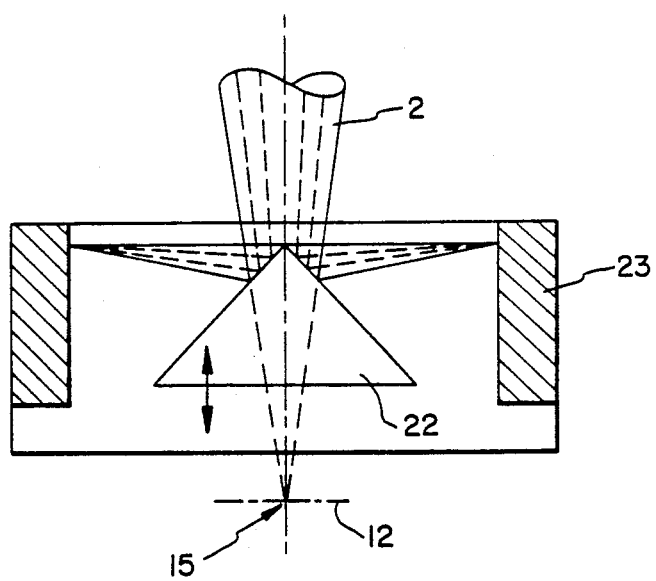
FIG. 3 shows a third embodiment of the present invention.

The devices illustrated in FIGS. 1-3 introduce into the focused laser beam highly reflective elements of specific geometries (hereafter referred to as reflector) in such a way that these reflective elements are subjected to only slight loads and transform the focal point of the laser beam to a focal line. Arranged along this focal line is at least one suitable sensor which features a relatively small receiving surface, i.e., a measuring surface that is smaller than the diameter of the focal point. An arrangement having several sensors allows for determining the lateral position of the focal point through lateral shifting of the device relative to the laser beam, i.e., relative to its focal point. In the case of a single sensor, the single sensor may be moved into various positions in several measuring cycles.

The focal point position in axial direction (the direction of the laser beam), as will be explained hereafter with the aid of the drawings, is determined by moving the device relative to the beam parallel or co-axially to its direction.

According to FIG. 1, device 1, which is for determining the position and diameter of the focal point of a laser beam 2, is comprised of can-shaped housing 3 whose one front side includes circular opening 4 which is axially symmetric to laser beam 2. Inside housing 3 is reflector 5 located axially across from opening 4. In the embodiment according to FIG. 1, reflector 5 is a rotationally symmetric conical body whose vertex point is turned highly accurately, and its shell line 6, originating from the vertex point, has the form of a rotational ellipsoid.

Ring-shaped reversing mirror 7 is disposed concentrically around reflector 5, and which on the side facing reflector 5 features 45° conic reflection surface 8. Disposed at 90° relative to one another in the reflection direction of the reflector 5, preferably four detection bores 9 are included within reversing mirror 7. Within each detection bore 9, one sensor 10 is disposed facing reflector 5. The measured values determined or generated by sensors 10 are transmitted to an external measuring device by means of measuring lines 11. Preferably, detection bores 9 have a relatively small diameter of less than about 0.3 mm. Further details of device 1 which is illustrated in FIG. 1 will be explained below by way of their mode of operation or use.

When used as a measuring instrument for determining the characteristic data of position and diameter of the focal point of laser beam 2, device 1 is moved in the direction of focal plane 12 (arrow X), coaxially to laser beam 2 and from the diverging side, i.e., viewed in beam direction, from the side situated behind focal plane 12. Laser beam 2 penetrates circular opening 4 of device 1 and is deflected on reflector 5, in the area of the diverging part of laser beam 2, after focusing in focal plane 12. This reflection is such that the bundled, nearly round outline of laser beam 2 will be reproduced in the form of a disc on ring-shaped reversing mirror 7. The relatively closed (compact) cross-sectional shape of laser beam 2 is thus scattered and reproduced as a disc-shaped beam on a focal line, with the output intensity at any point of this disc-shaped beam being considerably lower than that of focal point 15 of laser beam 2.

The disc-shaped beam is then reflected on 45° reflection surface 8 of reversing mirror 7 and impinges as a round beam on absorber 13 by way of which the thermal energy of laser beam 2 is removed.

Part of laser beam 2 which is deflected on reflector 5 penetrates detection bores 9 and is observed by sensors 10. In the simplest case, thermosensors are used as sensors 10, in which the energy of laser beam 2 is converted to heat, which is then removed through heat sink 14. The thermal flow in the thermal sensor results in a temperature gradient that is displayed with the aid of a suitable measuring device.

If device 1 and reflector 5 have complementary spacing relative to focal point 15, i.e., the base of conically shaped reflector 5 defines a plane which is generally parallel relative to focal plane 12, detection bores 9 will lie in the focal point, or in more practical terms a focal ring-like line, of the rotational ellipsoid serving as reflector 5. The second focal point, or in more practical terms the focal circular area, of a rotational ellipsoid is located in focal plane 12. (This is making use of the property of an ellipse, namely, that all beams from one focal point proceed after a reflection to another focal point, with beams from the vicinity of the focal point being deflected in the vicinity of the other focal point.) The diameter of laser beam 2 is the cross-sectional area of focal plane 12 through which beam 2 extends.

The lateral position of focal point 15 is determined to be on the axis of device 1 if the temperature observed by sensors 10 are symmetric.

Focal point 15 itself is then situated in focal plane 12 when a maximum temperature is observed; this setting can be found through a coaxial shifting of device 1 in the beam direction relative to the focusing optics of laser beam 2.

Lastly, the diameter of focal point 15 can be determined by carefully shifting ring-shaped reversing mirror 7 with detection bores 9 in the direction of laser beam 2, and the shifting also being relative to reflector 5 (arrow Y). Given a suitable design of device 1, the focal point diameter corresponds then to that amount of displacement about the zero position for which the temperature observed amounts to $1/e^2 = 13\%$ of the maximum value observed.

In the embodiment of FIG. 1, reflector 5, reversing mirror 7, and absorber 13 are preferably cooled, specifically water-cooled, bodies. Regarding shell line 6 of reflector 5, the embodiment of FIG. 1 can alternatively employ reflector 5 with shell line 6 which has the contour of a hyperboloid. Also, sensors 10 may be thermoelements, resistance thermometers, bolometers, diodes, pyroelectric receiving units, and the like.

Referring to FIG. 2, a second embodiment for determining the focal point and focal diameter is shown. The converging part of focused laser beam 2 is reflected on cylindrical mirror 20 whose axis is situated parallel to the beam axis. The reflected laser beam is reproduced in a circular focal line, on water-cooled absorber 21 located transversely to the direction of focused laser beam 2. For example, a ceramic material may be used to make absorber 21. The surface of absorber 21 is caused to glow along the circular focal line.

Focal plane 12 is positioned in the plane of the surface of absorber 21 when the glow emission of the heated surface is at its maximum. This can be determined visually, but electronic detection is also possible to determine the focal point position by way of the luminous intensity, using detection bores with integrated sensors which are arranged in the double radius of cylindrical mirror 20.

Focal point 15 is coaxial with the axis of cylindrical mirror 20 when the glowing ring is symmetrically located with respect to cylindrical mirror 20.

In the third embodiment according to FIG. 3, focal point 15 of laser beam 2, which is disposed in focal plane 12, is reflected on water-cooled conic mirror 22. The relative position of conic mirror 22 is determined when a luminous maximum exists on ring-shaped coaxial absorber 23 along a focal line and when the axis of absorber 23 is collinear with the axis of conic mirror 22. The direction of laser beam 2 and the axis of conic mirror 22 coincide when the luminous appearance is exactly symmetric.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A process for determining the position and diameter of the focal point of a laser beam, specifically a heavy-duty laser beam, comprising the steps of:
   a) introducing into the path of rays of a focused laser beam rotationally symmetric reflector which reproduces the laser beam on a focal line;
   b) capturing the laser beam reflected on the reflector by way of at least one sensor which is fixedly coordinated with the reflector in the focal line;
   c) determining a focal plane by way of a measured value captured in the sensor, in that the reflector along with the sensor is shifted in the direction of the laser beam, relative to the laser beam's focusing optics;
   d) determining the position of the focal point in the focal plane by way of the measured value captured in the sensor, and the reflector along with the sensor is shifted perpendicularly to the direction of the laser beam, relative to the laser beam's focusing optics; and
   e) determining the diameter of the focal point via the measured value captured in the sensor when the sensor is shifted relative to the reflector.

2. The process of claim 1 further comprising the step of introducing the reflector behind the focal plane from a diverging side of the laser beam, relative to the beam direction.

3. The process of claim 1 further comprising the step of introducing the reflector before the focal plane on a converging side of the laser beam, relative to the beam direction.

4. A device for determining the position and diameter of the focal point of a laser beam, specifically a heavy-duty laser beam, comprising:
   a) a highly reflective rotationally symmetric reflector whose reflection surface, impinged by the laser beam, is so fashioned that the laser beam will be reproduced in a complementary ring-shaped focal line, and
   b) a plurality of sensors disposed axially symmetric to the reflector, by means of which a focal plane and a focal point diameter can be determined.

5. The device of claim 4, wherein the reflector is disposed on a the diverging side of the laser beam, characterized in that the reflection surface has the shape of a rotational ellipsoid or a rotational hyperboloid, and in that axially symmetric to the reflector a ring-shaped reversing mirror is provided which in the focal line of the reflector features a number of detection bores which correspond to the number of sensors and in which sensors are inserted, said ring-shaped reversing mirror deflects a disc-shaped laser beam coming from the reflector to a thermal absorber.

6. The device of claim 4, wherein the reflector is disposed on a converging side of the laser beam, characterized in that the reflection surface has the shape of a cylinder or cone and in that, axially symmetric to the reflector, a ring-shaped thermal absorber is arranged which in the focal line of the reflector features a number of detection bores with inserted sensors that correspond to the number of sensors.

7. The device of claim 4 wherein the reflector is water-cooled.

8. The device of claim 5 wherein the reversing mirror and the absorber are water-cooled.

9. The device of claim 6 wherein the absorber is water-cooled.

10. A process for determining the position and diameter of the focal point of a high intensity laser beam, comprising the steps of:
    positioning a rotationally symmetric reflector in the path of a focused laser beam to reproduce the laser beam on a focal line;
    measuring the intensity value of the laser beam reflected on the reflector by means of at least one sensor which is fixedly positioned adjacent the reflector and located on the focal line;
    determining the location of the focal plane according to the measured value of a sensor, by coaxially shifting the reflector in the direction of the laser beam and relative to the laser beam's focusing optics;
    determining the lateral position of the focal point according to the measured value of the sensor, by shifting the reflector with respect to the sensor in the direction of the laser beam and relative to the focusing optics of the laser beam; and
    determining the diameter of the focal point according to the measured value of the sensor, by shifting the sensor relative to the reflector.

11. The process of claim 10 wherein the positioning step includes moving the reflector from axially beyond the focal plane at a diverging side of the laser beam.

12. The process of claim 10 wherein the positioning step includes moving the reflector axially ahead of the focal plane on a converging side of the laser beam.

13. An apparatus for determining the position and diameter of the focal point of a high intensity laser beam, comprising:
    means for reproducing the laser beam in a complementary ring-shaped focal line, said reproducing means including a highly reflective rotationally symmetric reflector having a reflective surface; and
    sensor means for determining a focal plane and a focal point diameter, said sensor means being axially symmetric to the reflector.

14. The apparatus of claim 13, wherein said sensor means includes four sensors.

15. The apparatus of claim 13, wherein said reflector is disposed on a diverging side of the laser beam, and said reflective surface has a shape of a rotational ellipsoid, said apparatus further comprising a thermal absorber and a ring-shaped reversing mirror disposed axially symmetric to said reflector and facing said thermal absorber, said reversing mirror including at least one detection bore for housing said sensor means disposed along the focal line of said reflector, whereby said reversing mirror deflects a disc-shaped laser beam coming from said reflector onto said thermal absorber.

16. The apparatus of claim 13, wherein said reflector is disposed on a diverging side of the laser beam, and said reflective surface has a shape of a rotational hyperboloid, said apparatus further comprising a thermal absorber and a ring-shaped reversing mirror disposed axially symmetric to said reflector and facing said thermal absorber, said reversing mirror including at least one detection bore for housing said sensor means disposed along the focal line of said reflector, whereby said reversing mirror deflects a disc-shaped laser beam coming from said reflector onto said thermal absorber.

17. The apparatus of claim 13, wherein said reflector is disposed on a converging side of the laser beam, and said reflective surface has the shape of a cylinder, said apparatus further comprising a ring-shaped thermal absorber disposed axially symmetric to said reflector, said thermal absorber including at least one detection bore for receiving said sensor means, said detection bore being disposed along the focal line of said reflector.

18. The apparatus of claim 13, wherein said reflector is disposed on a converging side of the laser beam, and said reflective surface has the shape of a cone, said apparatus further comprising a ring-shaped thermal absorber disposed axially symmetric to said reflector, said thermal absorber including at least one detection bore for receiving said sensor means, said detection bore being disposed along the focal line of said reflector.

19. The apparatus of claim 13 wherein said reflector is water-cooled.

20. The apparatus of claim 15 wherein said reversing mirror and said absorber are water-cooled.

21. The apparatus of claim 16 wherein said reversing mirror and said absorber are water-cooled.

22. The apparatus of claim 17 wherein said absorber is water-cooled.

23. The apparatus of claim 18 wherein said absorber is water-cooled.

* * * * *